US012502845B2

(12) United States Patent
Oymann et al.

(10) Patent No.: US 12,502,845 B2
(45) Date of Patent: Dec. 23, 2025

(54) DEVICE FOR WELDING TWO OVERLAPPING FILM SECTIONS SITUATED ON ONE SIDE OF GOODS STACK TO FORM WRAPPING

(71) Applicant: MSK—Verpackungs-Systeme GmbH, Kleve (DE)

(72) Inventors: Michael Oymann, Xanten (DE); Enrico Czok, Kleve (DE); Christian Mrowka, Drevenack (DE)

(73) Assignee: MSK—Verpackungs-Systeme GmbH, Kleve (DE)

( * ) Notice: Subject to any disclaimer, the term of this patent is extended or adjusted under 35 U.S.C. 154(b) by 125 days.

(21) Appl. No.: 18/124,089

(22) Filed: Mar. 21, 2023

(65) Prior Publication Data

US 2023/0294368 A1    Sep. 21, 2023

(30) Foreign Application Priority Data

Mar. 21, 2022   (DE) .......................... 202022101464.7

(51) Int. Cl.
B29C 65/00  (2006.01)
B29C 65/22  (2006.01)

(52) U.S. Cl.
CPC .......... B29C 66/9261 (2013.01); B29C 65/22 (2013.01); B29C 66/1122 (2013.01)

(58) Field of Classification Search
CPC .......... B29C 66/81451; B29C 66/9261; B29C 66/1122; B29C 66/8122; B29C 66/81422; B29C 66/81423; B29C 66/0044; B29C 66/431; B29C 66/496; B29C 66/81463; B29C 66/81871; B29C 66/8322; B29C 66/849; B29C 65/22–229; B29C 65/30;

(Continued)

(56) References Cited

U.S. PATENT DOCUMENTS 3,067,309 A    12/1962  Chinn
3,243,574 A  *  3/1966  Blythe .................. B29C 65/224
                                          219/250

FOREIGN PATENT DOCUMENTS

CA       2324141 A1        4/2002
EP       3885110 A1        9/2021
KR    20140144059 A  *   12/2014

OTHER PUBLICATIONS

Eurpean Search Report from related EP Application No. 23162827.2 dated Jun. 28, 2023.

* cited by examiner

*Primary Examiner* — John L Goff, II
(74) *Attorney, Agent, or Firm* — CALDERON SAFRAN & WRIGHT P.C.

(57) ABSTRACT

The invention is a device for welding two overlapping film sections situated on one side of a goods stack. The device includes a welding bar with a welding surface oriented in the direction of the film sections to be welded. The spacing between the welding bar and the film sections is reducible. The welding surface is elastically deformable into a concave course and/or to a convex course between its two ends. At least one displacing device adjusts the course of the welding surface to a concave and/or to a convex course. The displacing device displaces welding bar. A control unit of the welding bar individually controllable, such that the curvature of the welding bar is adjustable to the contour of the side of the goods stack in the region of the film sections to be welded with one another for the subsequent welding of the overlapping film sections.

20 Claims, 8 Drawing Sheets

(58) Field of Classification Search
CPC . B29C 65/2038; B29C 65/20; B29C 65/2007; B29C 65/2015; B29C 66/81421; B65B 51/12; B65B 51/14; B65B 59/001; B65B 59/02; B65B 11/585; B65B 13/32
USPC ..................................................... 156/583.3
See application file for complete search history.

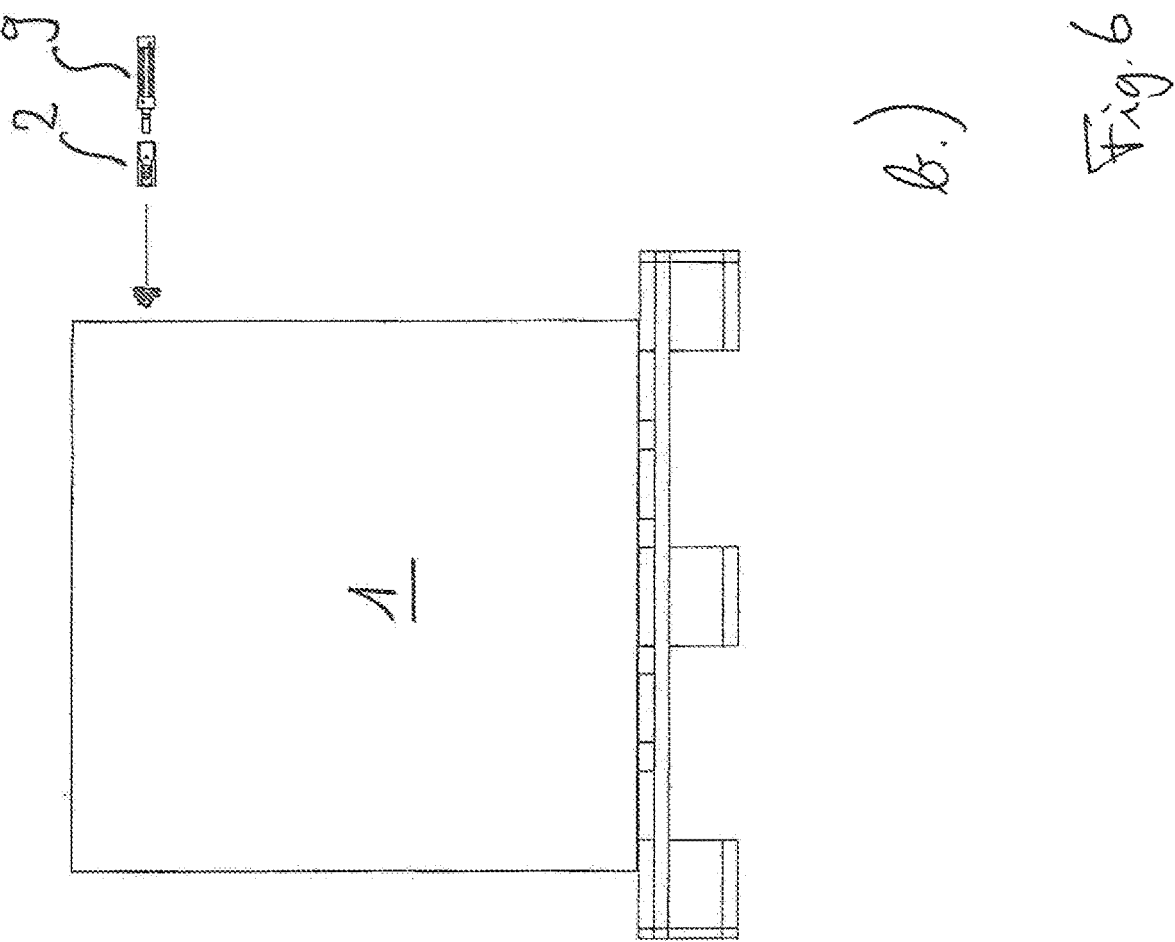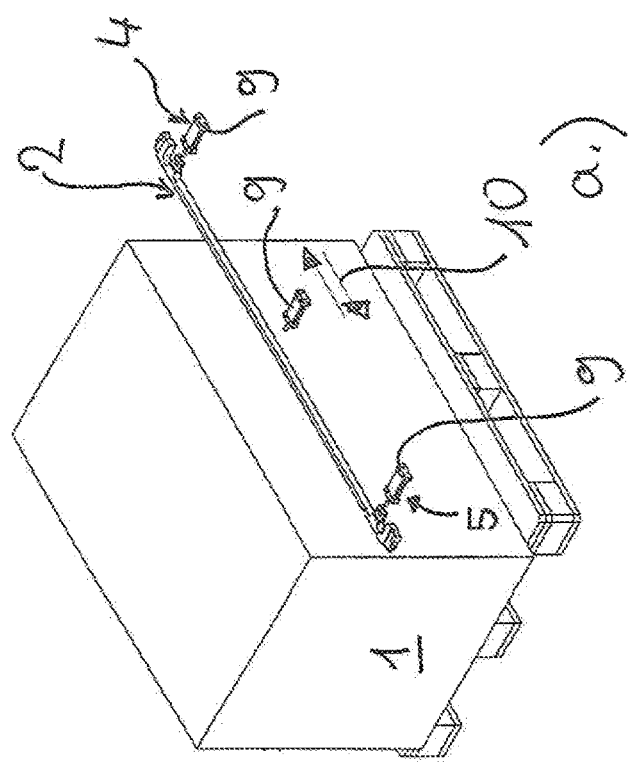
Fig. 6

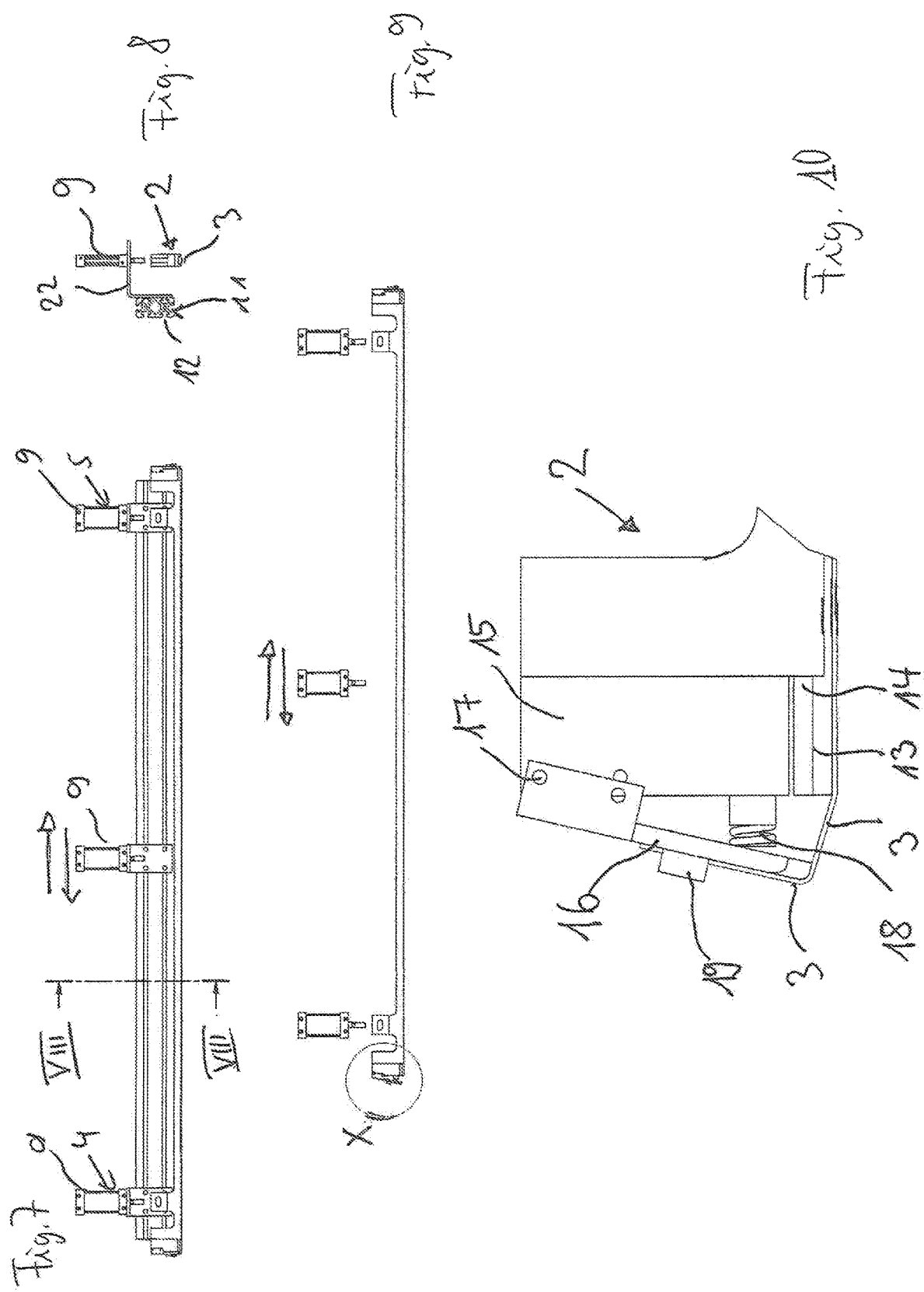

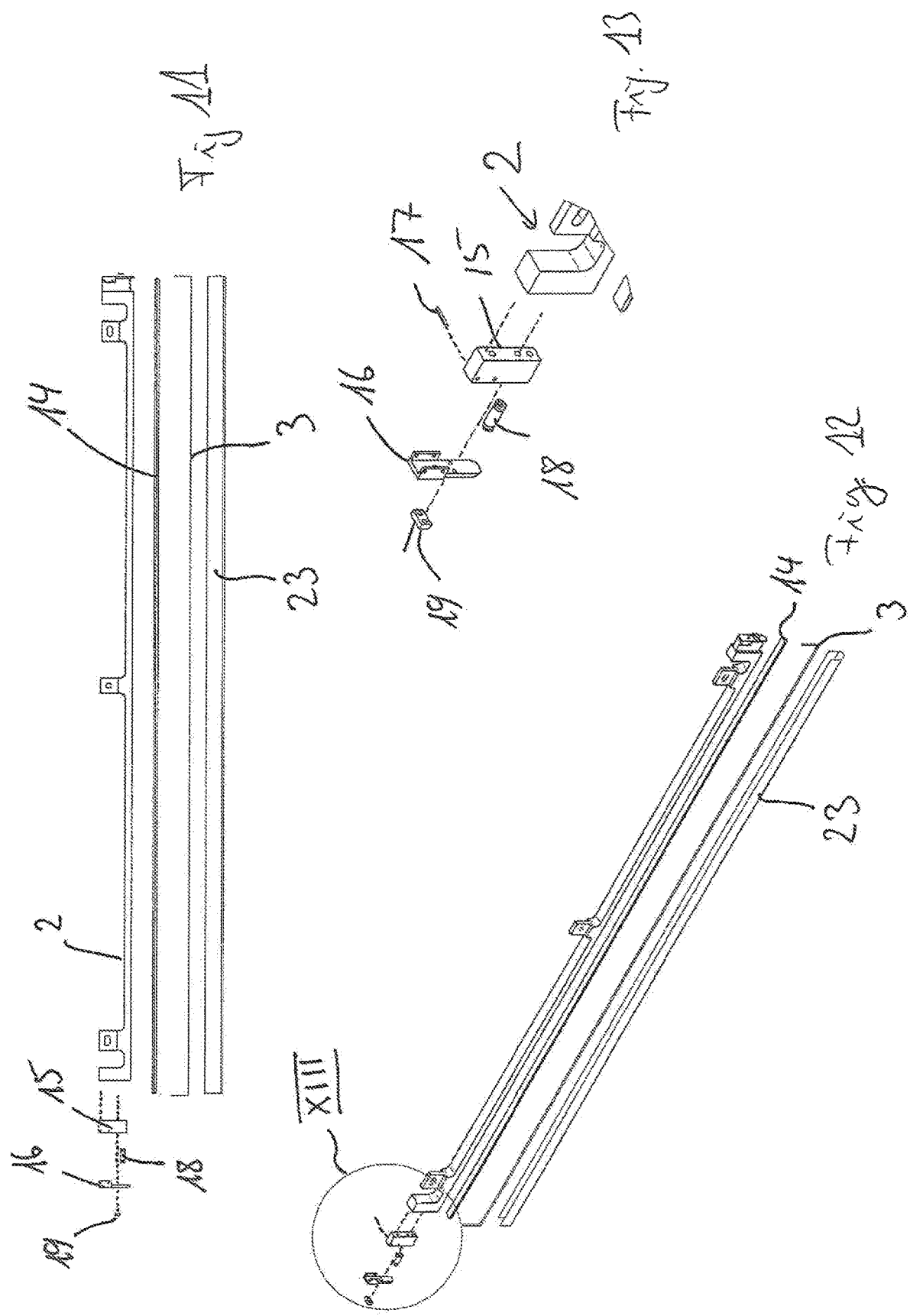

DEVICE FOR WELDING TWO OVERLAPPING FILM SECTIONS SITUATED ON ONE SIDE OF GOODS STACK TO FORM WRAPPING

CROSS-REFERENCE TO RELATED APPLICATIONS AND CLAIM TO PRIORITY

This application is related to Patent Application No. 20 2022 101 464.7 filed Mar. 21, 2022, in Germany, the disclosure of which is incorporated herein by reference and to which priority is claimed.

FIELD OF THE INVENTION

The invention concerns a device for welding two overlapping film sections situated on a side of a goods stack, preferably on the upper side of a goods stack, to form a wrapping, where the device exhibits a welding bar with a welding surface oriented in the direction of the film sections to be welded, where the welding bar exhibits a mounting at least in the region of each of its two ends and where for welding of the film sections the spacing between the welding bar and the film sections to be welded is reducible all the way to contact.

BACKGROUND OF THE INVENTION

In practice, goods stacks can exhibit non-negligible dimensions. Thus for example, a goods stack consisting of plasterboards can exhibit a length of more than 5 m and a width of more than 2 m. Due to the dimensions, wrapping with a hood is not possible since appropriate aperture dimensions are difficult to realize with a hood. Therefore, as a wrapping there is for example first placed a cover sheet film onto the upper side of the goods stack and then a film sleeve placed around the goods stack. The film sleeve is so placed around the goods stack that the film sleeve projects at the upper side while forming an overhang. The overhang is then placed onto and around the cover sheet film. In order to ensure adequate water tightness, the overhang of the film sleeve and the cover sheet film are then welded by means of lowerable welding bars. The welding bars are lowered from above onto the film sections to be welded, until the welding bars are with their welding surface in contact with the upper film section. In such a design, the cover sheet film constitutes one film section and the overhang of the film sleeve the other (upper) film section.

It proves to be disadvantageous for the upper side of the goods stack to sag due to the large dimensions. It is, however, also quite possible for the upper side of the goods stack to be configured for example as arched upward in the middle. The consequence of this is that both with a sagging and with an upward-arched upper side of the goods stack, the welding bar does not lie on the film section across the entire length of its welding surface, such that in this respect uniform sealing is not possible at every point along the welding surface.

SUMMARY OF THE INVENTION

It is the task of the invention to prevent the aforementioned drawbacks and to propose a device which makes possible better welding of two overlapping film sections on one side, for example on the upper side of a goods stack, in cases where the relevant side of the goods stack exhibits concave and/or convex regions along the intended welding.

This task is solved by having at least the welding surface of the welding bar configured as elastically deformable for adjusting the welding surface to a concave course and/or to a convex course of the side of the goods stack between its two ends and by assigning to the welding bar between the two mountings at least one displacing device, preferably acting at least in the direction of the film sections to be welded, for adjusting the course of the welding surface to a concave and/or to a convex course of the side of the goods stack, and in at least one mounting and/or in at least one displacing device the contact region with which this mounting and/or this displacing device respectively acts on the welding bar being displaceable along the course of the welding bar as seen in the longitudinal extension of the welding bar, and by the device comprising a control unit for at least one displacing device, preferably for all displacing devices, where each displacing device of the welding bar is controllable individually, such that the curvature of the welding bar is adjustable to the contour of the side of the goods stack in the region of the film sections to be welded with each other for the subsequent welding of the overlapping film sections.

Before the welding process, the welding bar is oriented parallel to the side of the goods stack at which the film sections are to be welded. This is the rest position. In the rest position the welding bar is arranged at a distance from the film sections to be welded. For welding the film sections, the distance between the welding bar and the film sections to be welded is then decreased all the way to contact in the welding position. The direction of movement of each displacing device is here exclusively orthogonal to the orientation of the side of the goods stack at which the film sections to be welded are situated.

The welding surface preferably extends over the entire length of the welding bar. The length of the welding surface of the welding bar can lie between 100 cm and 300 cm, preferably between 140 cm and 260 cm. Each mounting is here so configured that the welding bar when seen in the longitudinal extension can be curved in the direction of the film sections to be welded and/or opposite to the direction of the film sections to be welded.

If a displacing device acts only in the direction of the film sections to be welded, the relevant displacing device can press the welding bar in the contact region only against the film sections to be welded. Such a design allows the welding of two film sections which are situated in the region of a hollow for example of the upper side of the goods stack, i.e. in a concave region. By means of the relevant displacing device, the welding bar is also pressed in the region of the hollow against the film sections to be welded, such that the welding bar is in contact along the entire length with the film sections to be welded.

If a displacing device also acts against the direction of the film sections to be welded, i.e. away from the film sections to be welded, the relevant displacing device can also pull away the welding bar from the side of the goods stack in the contact region.

Of course, the device can also exhibit several of the displacing devices described above. Then secure welding is also possible over the entire length of the welding surface if the side of the goods stack exhibits concave and convex regions along the intended welding.

The device can further exhibit here a goods stack displacing device, preferably a goods stack displacing device configured as a lifting device, for displacing the goods stack in the direction of the welding bar for welding. In such a design the welding bar can be arranged immovably in the region of its two mountings. Should there be in the region of the upper side of the goods stack film sections to be welded, the goods stack is raised. Should film sections be welded in the region of one side of the goods stack, the goods stack is moved sideways against the welding bar.

At least one of the two mountings, preferably both mountings, can be configured as a displacing device for displacing the welding bar from its rest position, in which the welding bar is arranged at a distance from the film sections to be welded, in the direction of the side of the goods stack into its welding position, in which the welding bar is in contact with the upper film section of the two overlapping film sections to be welded with one another, where in this case too the device comprises a control unit for at least one displacing device, preferably for all displacing devices, where each displacing device of the welding bar is individually controllable, such that the curvature of the welding bar for the subsequent welding of the overlapping film sections is adjustable to the contour of the side of the goods stack in the region of the film sections to be welded with one another. In such a design, the goods stack can for example stand on a chain conveyor. Should two film sections be welded with one another in the region of the upper side of the goods stack, the welding bar is lowered for welding. Should two film sections be welded with one another in the region of a side of the goods stack, the welding bar is moved sideways against the goods stack for welding. After the welding process, the welding bar is displaced again away from the goods stack, preferably from its welding position back into its rest position.

The welding bar can be configured as a flexible rail, preferably consisting of aluminum, with the welding surface oriented in the direction of the film sections to be welded. Of course, other suitable materials are also conceivable.

The welding surface can be configured here as a welding wire. In such a case, the welding surface is configured more in a linear form and exhibits a small width. However, other designs of a welding surface are also possible.

The welding wire can be stretched between the two ends of the welding bar, where the welding wire is guided along a pressure surface oriented in the direction of the film sections to be welded. The welding wire is thereby stretched in both deflection directions of the welding bar. The pressure surface supports the stretched welding wire during welding.

The welding wire is preferably insulated by an insulation layer from the pressure surface. Such a design suggests itself if for example the rail consists of a conducting material, such as for example aluminum. The pressure surface and the insulation layer can be configured in two parts. However, it is certainly also possible for the pressure surface itself to form the insulation layer. Then the pressure surface can for example be configured as a silicone band.

In order to prevent the hot welding wire from adhering to the upper film section during welding, it would be appropriate for the welding surface to be provided with a sheathing serving as a protective layer.

At least one mounting and/or at least one displacing device can be arranged slidingly at a rail for displacing the contact region, with which this mounting and/or this displacing device respectively acts on the welding bar. The rail can for example be an element of an abutment framework. In this way the mounting and/or the displacing device for example can each be attached to a sled which is arranged moveably on the rail.

At least one rail can exhibit an undercut groove which extends along the rail, and the mounting and/or the displacing device can each exhibit at least one slot nut interacting with the groove and guided in the groove. A slot nut can be connected directly or indirectly—for example via an angle piece—with the mounting or with the displacing device. The rail can for example be an ITEM profile.

At least one mounting and/or at least one displacing device can be manually displaceable for orienting against the side of the goods stack to be welded.

At least one mounting and/or at least one displacing device can of course be displaceable in a motorized manner through a suitable drive. Thus for example, a drive can be provided which drives a surrounding chain which acts on the mounting and/or the displacing device.

At least one displacing device can be configured as a gear rack.

At least one displacing device can be configured as a cylinder.

At least one cylinder can be configured as a pneumatic cylinder.

At least one cylinder can be configured as a hydraulic cylinder.

BRIEF DESCRIPTION OF THE DRAWINGS

In the following, embodiment examples of invention depicted in the drawings are elucidated. The drawings show.

DETAILED DESCRIPTION OF THE PREFERRED EMBODIMENT(S)

Figure 1:
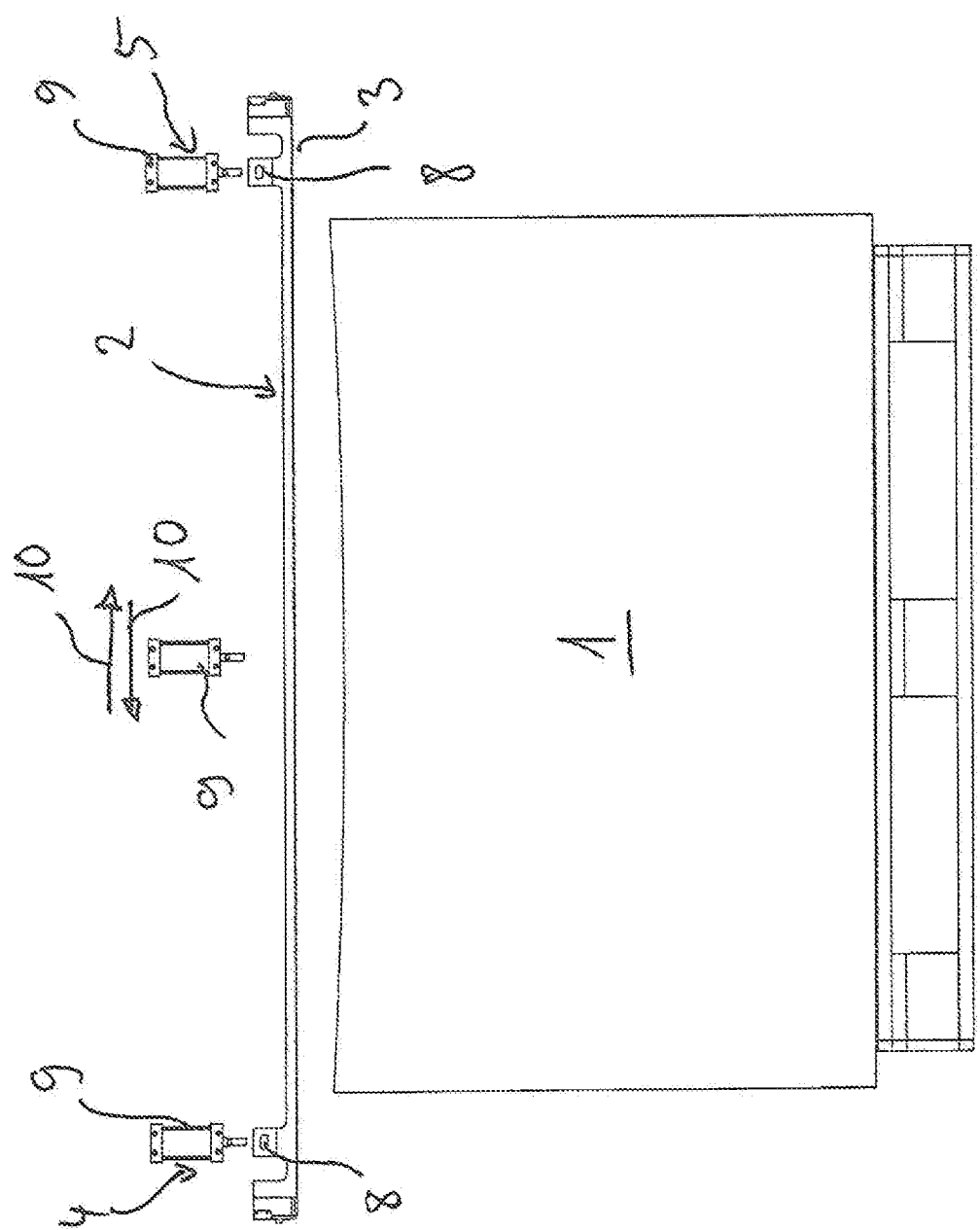
FIG. 1 A first embodiment example of a device according to the invention with a goods stack exhibiting a concave surface, FIG. 2 A first embodiment example of a device according to the invention with a goods stack exhibiting a convex surface, FIG. 3 A second embodiment example of a device according to the invention with a goods stack exhibiting a concave surface, FIG. 4 A second embodiment example of a device according to the invention with a goods stack exhibiting a convex surface, FIG. 5 A third embodiment example of a device according to the invention with a goods stack exhibiting a concave surface, FIGS. 6*a* and *b* An oblique top view and a side view of a fourth embodiment example of a device according to the invention, FIG. 7 A side view of a welding bar attached to a rail, FIG. 8 A section in the direction VIII-VIII through the object according to FIG. 7, FIG. 9 A side view of the welding bar according to FIG. 7 without rail, FIG. 10 The detail X from FIG. 9, FIG. 11 An exploded view of the welding bar according to FIG. 7 in side view without rail, FIG. 12 An oblique view of the object according to FIG. 11, and FIG. 13 The detail XIII from FIG. 12.

In all drawings, consistent reference labels are used for similar or equal components.

The drawings depict different designs of devices for welding two overlapping film sections situated on a side of a goods stack 1 to form a wrapping.

The wrapping is not depicted in the drawings. Usually the wrapping consists of a cover sheet film which is placed on the upper side of a goods stack 1. Usually a film sleeve is then drawn around the goods stack 1, where film sleeve is configured as open at the top and bottom. The film sleeve forms a film overhang and overhangs the upper side of the goods stack 1. If the wrapping should for example offer protection against rain, then after the drawing around the film overhang is welded with the cover sheet film on the upper side.

Figure 2:
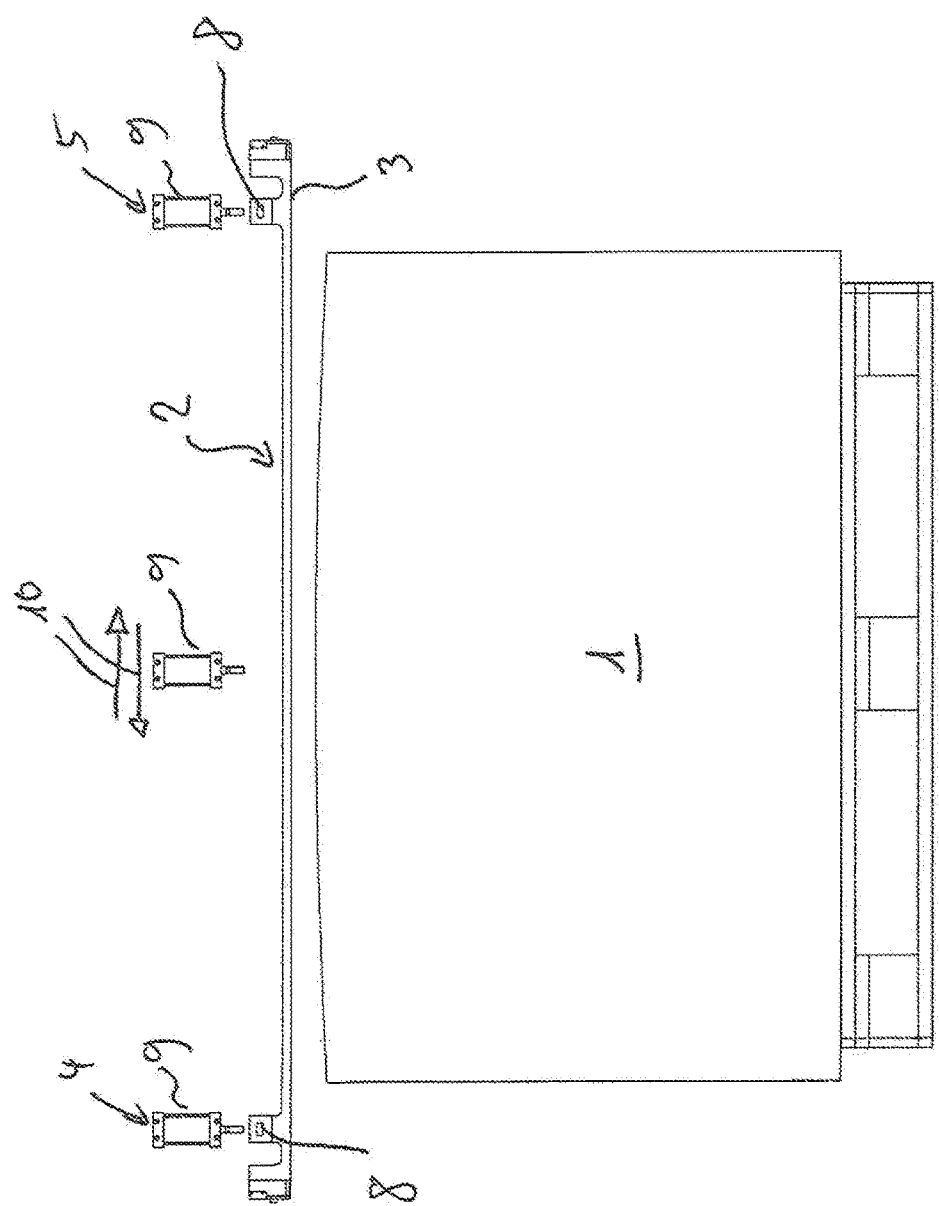
Figure 3:
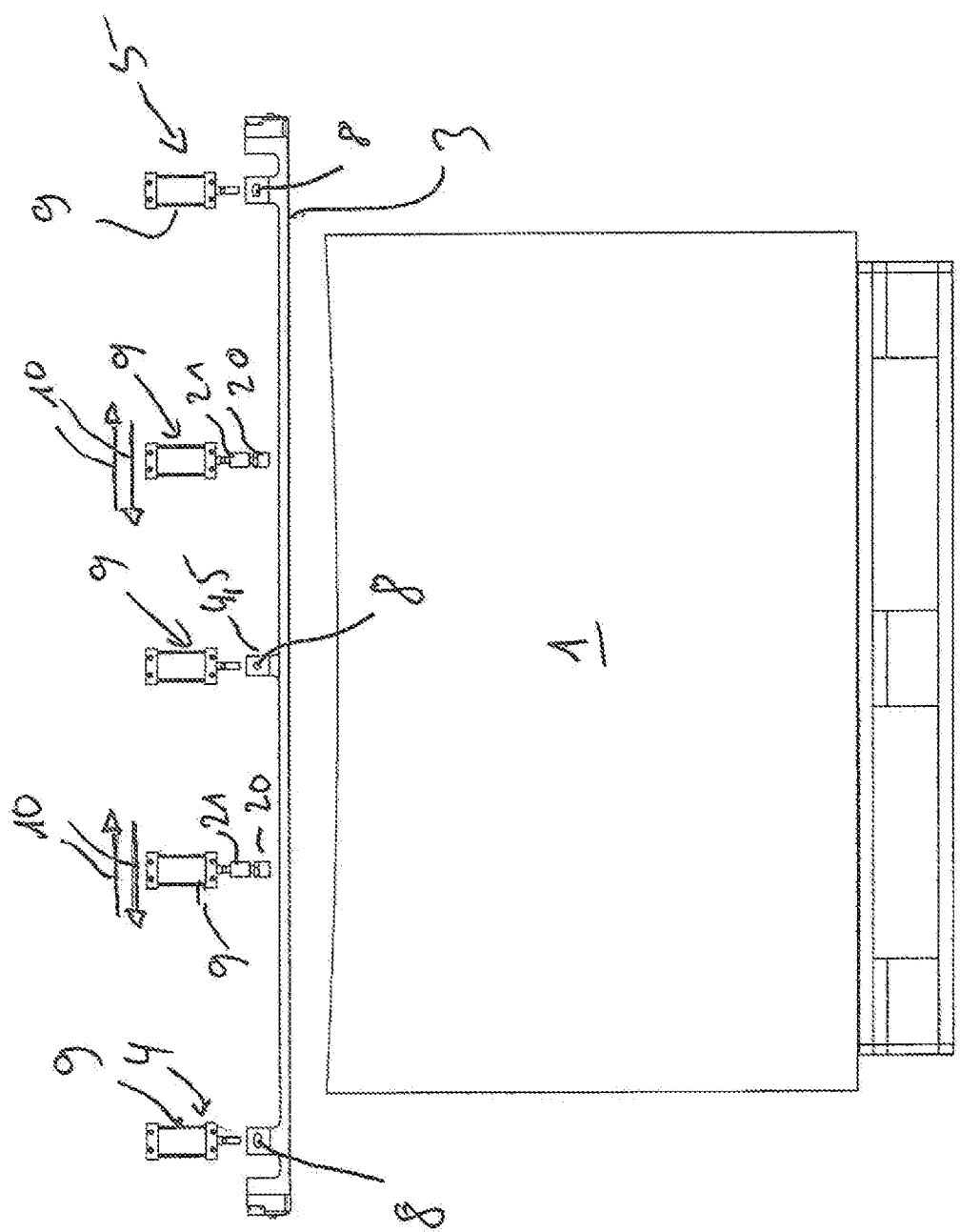
Figure 4:
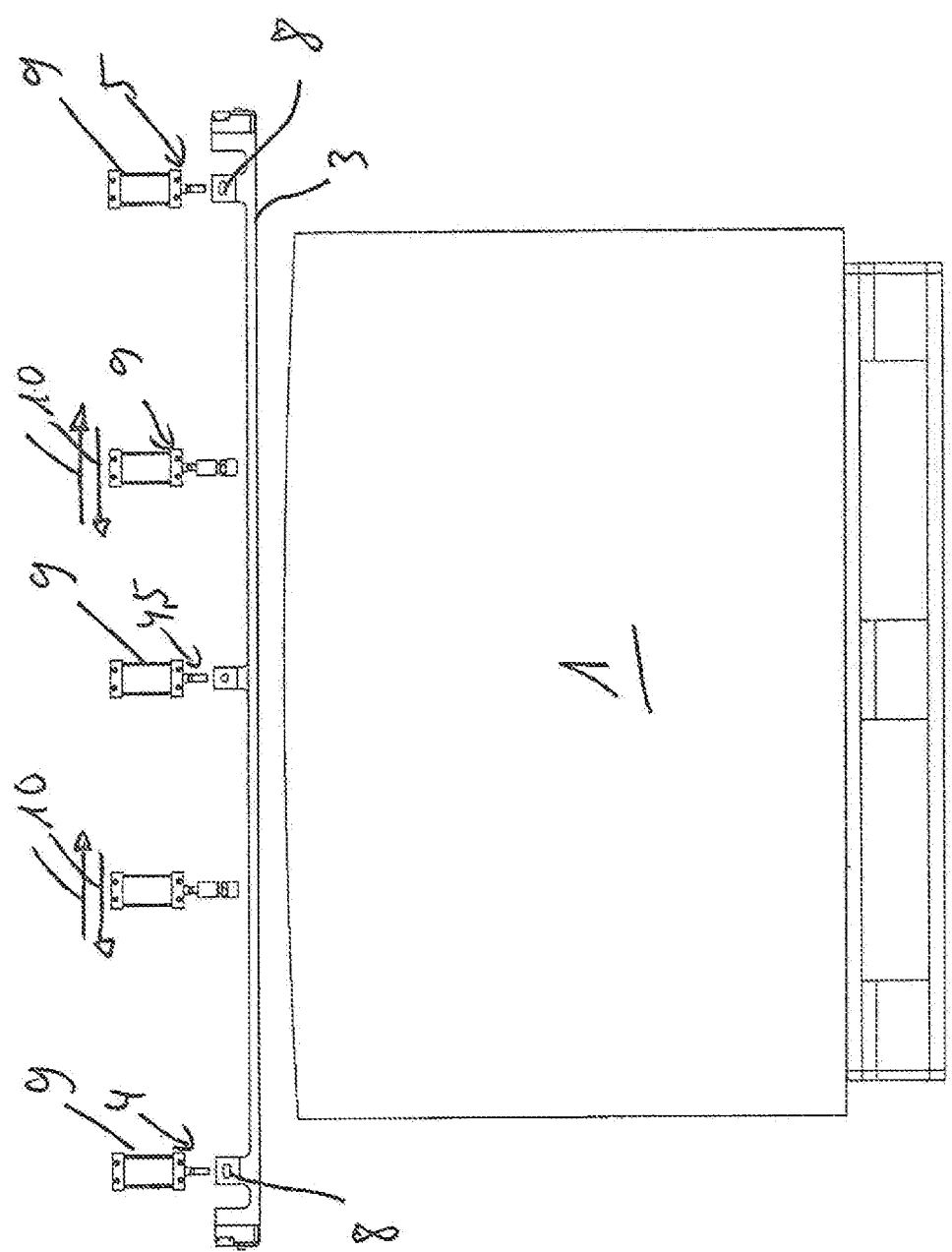
Figure 5:
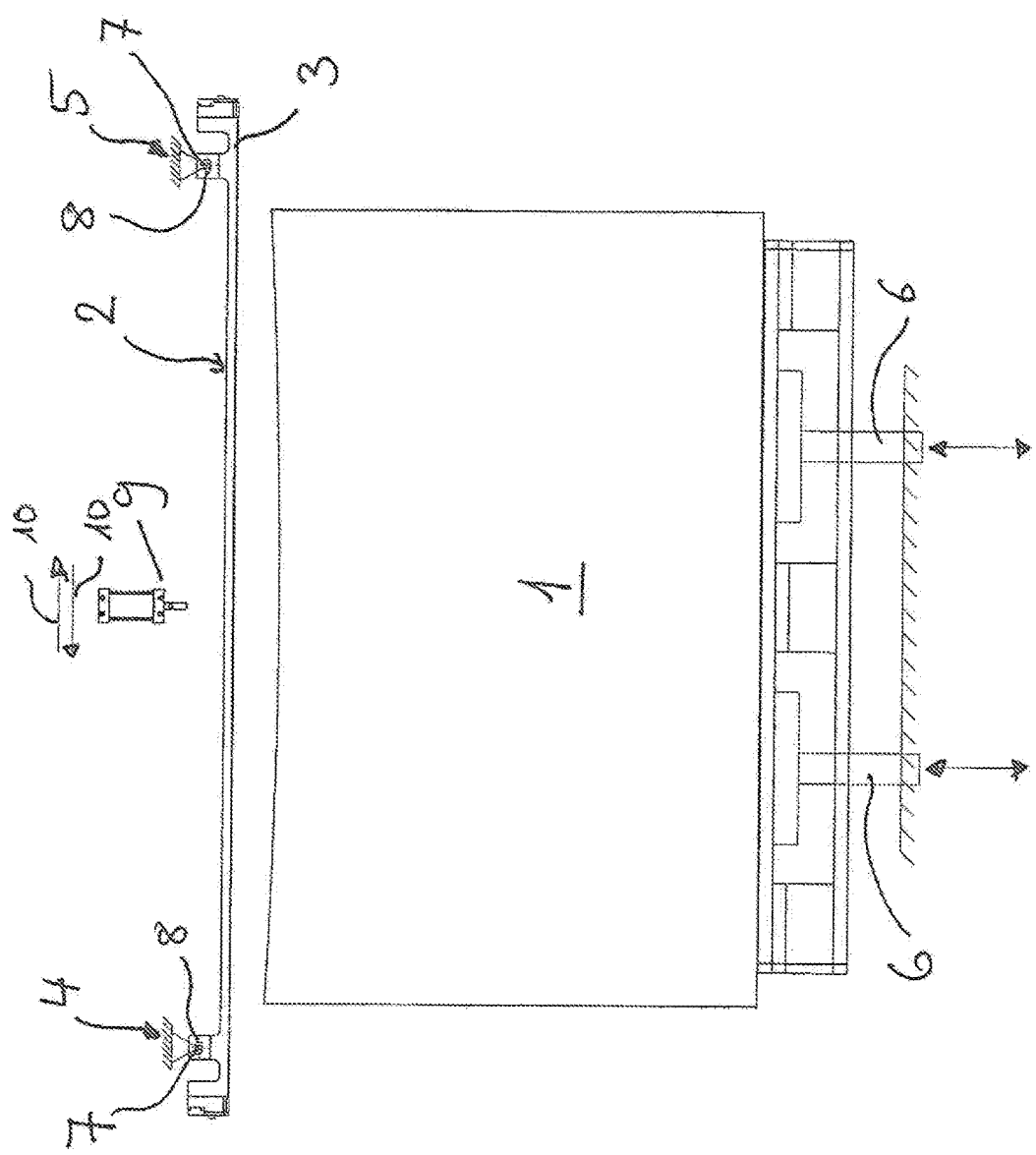

The upper side of the goods stack 1 depicted in FIGS. 1, 3 and 5 exhibits a central hollow and is thereby configured concavely. In FIGS. 2 and 4 there is depicted a goods stack 1 with an upper side which is arched and thereby configured convexly.

In the embodiment example according to FIGS. 6*a* and 6*b*, the film sections are welded with one another on a longitudinal side of the goods stack 1. For this purpose the cover sheet film is larger than the upper side of the goods stack 1. Before the drawing over of the film sleeve, the overhanging margins of the cover sheet film are placed around the upper edge of the goods stack 1.

The device comprises a welding bar 2 with a welding surface 3 oriented in the direction of the film sections to be welded, where the welding bar 2 exhibits a mounting 4, 5 in the region of each of its two ends.

For the welding of the film sections to be welded, the spacing between the welding bar 2 and the film sections to be welded can be reduced all the way to contact. In the embodiment examples according to FIGS. 1 to 4, the welding bar 2 is lowered in the direction of the upper side of the goods stack 1 until the welding surface 3 of the welding bar 2 is in contact with the film sections to be welded of the goods stack 1.

In the design depicted in FIG. 5, the welding bar 3 is not vertically moveable. Therefore, the device further exhibits a goods stack displacing device configured as a lifting device 6 for displacing the goods stack 1 in the direction of the welding bar 2 for welding. For welding, the goods stack 1 is raised by means of the lifting device 6 until the goods stack 1 comes into contact with the welding surface 3 of the welding bar 2 in the region of its opposite upper edge.

In FIG. 6 there is depicted a design which is suitable for welding two film sections in the region of a side of the goods stack 1. In such a design, either the welding bar 2 is moved sideways against the goods stack 1. Alternatively or additionally, the welding bar 2 can also be arranged immovably and the goods stack 1 can for example be moved by means of a conveying device against the welding bar 2.

Each welding bar 2 exhibits in the region of each of its two ends a mounting 4, 5. In the design according to FIG. 5, each mounting 4, 5 is configured as a bearing arranged immovably. Each bearing exhibits a bolt 7 which is guided in an oblong hole 8 assigned to the welding bar 2. Thereby the welding bar 2 is mounted rotatably and slidingly at least to a small extent, such that the welding bar 2 can be flexed downward or upward.

For adjusting the course of the welding surface 3 to a concave and/or to a convex course of the side of the goods stack 1 between the two mountings 4, 5, in the design according to FIG. 5 there is provided a displacing device 9 acting in the direction of the film sections to be welded. The device comprises for the displacing device 9 a control unit, not shown, such that the displacing device 9 is individually controllable. Thereby the curvature of the welding bar 2 can be adjusted to the contour of the in this case concave upper side of the goods stack 1 in the region of the film sections to be welded with one another for the subsequent welding of the overlapping film sections.

In the designs according to FIGS. 1 to 4, the two mountings 4, 5 provided in the region of the two ends of the welding bar 2 are themselves also each configured as a displacing device 9, such that hereby the welding bar 2 can be moved from its rest position, in which the welding bar 2—as depicted in the drawings—is arranged at a distance from the film sections to be welded, in the direction of the upper side of the goods stack 1 into its welding position in which the welding bar 2 is in contact with the upper film section of the two overlapping film sections to be welded with one another. The device comprises also for these displacing devices 9 a control unit, where each displacing device 9 of the welding bar 2 is individually controllable, such that the curvature of the welding bar 2 is adjustable to the contour of the side of the goods stack 1 in the region of the film sections to be welded with one another for the subsequent welding of the overlapping film sections. In such a design, the goods stack 1 can for example remain set down on a chain conveyor during welding, since the welding bar 2 is moved up to the goods stack 1.

The embodiment examples according to FIGS. 1 and 2 on the one hand and according to FIGS. 3 and 4 on the other differ by the device according to FIGS. 1 and 2 exhibiting only in the region of the two ends of the welding bar 2 a displacing device 9 configured as a mounting 4, 5.

In the embodiment example according to FIGS. 3 and 4, there is provided in the middle a third displacing device 9 configured as a mounting, which in this respect engages centrally with the welding bar 2. In this embodiment example, the three displacing devices 9 configured as a mounting, which are each connected directly with the welding bar 2 via the bolt 7 and the oblong hole 8, constitute in this respect a base for lifting and for lowering the welding bar 2.

Both in the embodiment example according to FIGS. 1 and 2 and in the embodiment example according to FIGS. 3 and 4, there is assigned respectively between two adjacent displacing devices 9 configured as mounting 4, 5 a displacing device 9 acting in the direction of the film sections to be welded for adjusting the course of the welding surface 3 to a concave and/or to a convex course of the side of the goods stack 1. The device comprises for each displacing device 9 a control unit, such that each displacing device 9 of the welding bar 2 is individually controllable. The curvature of the welding bar 2 can thereby be adjusted to the contour of the side of the goods stack in the region of the film sections to be welded with one another for the subsequent welding of the overlapping film sections.

As can be gathered from FIGS. 1 to 4, there is provided both in the design according to FIGS. 1 and 2 and in the design according to FIGS. 3 and 4 a further displacing device 9 between two adjacent displacing devices 9 configured as mounting 4, 5. Each further displacing device 9 acts in the direction of the film sections to be welded and serves for adjusting the course of the welding surface 3 to a concave and/or to a convex course of the side, in this case the upper side, of the goods stack 1. In each further displacing device 9, the contact region with which this displacing device 9 acts on the welding bar 2 is displaceable along the welding bar 2 as seen in the longitudinal extension of the welding bar 2. The device comprises for each further displacing device 9 a control unit, where each further displacing device 9 of the welding bar 2 is individually controllable, such that the curvature of the welding bar 2 is adjustable to the contour of the side of the goods stack 1 in the region of the film sections to be welded with one another for the subsequent welding of the overlapping film sections. In particular, the design according to FIGS. 3 and 4 allows very good adjustment of the welding surface 3 to an upper side of a goods stack 1, even if the upper side exhibits convex and concave regions when seen in the longitudinal direction of the welding bar 2.

In the design depicted in FIG. 5, the goods stack 1 is lifted for welding by means of the lifting device 6, until the goods stack 1 comes into contact with the welding surface 3 of the welding bar 2 in the region of its opposite upper edge. The displacing device 9 is then activated, such that the welding bar 2 is pushed down in the region of its center in the direction of the upper side of the goods stack 1. Consequently, the welding surface 3 is adjusted to the concave course of the upper side of the goods stack 1 and thereby a good welding result is achieved along the entire length of the welding surface 3.

As indicated by the arrows 10, the displacing device 9 is horizontally moveable. Thereby the contact region, i.e. the place at which the displacing device 9 acts on the welding bar 2, can be displaced and adjusted along the course of the welding bar 2 as seen in the longitudinal extension of the welding bar 2. Thereby the device can be adjusted optimally to the respective course of the upper side of the goods stack 1.

As the drawings show, the direction of movement of each displacing device 9 is exclusively orthogonal to the orientation of the side of the goods stack 1 at which the film sections to be welded are situated. The displacement and welding process is elucidated using the example of FIGS. 1 and 2. In the design of the upper side of the goods stack 1 according to FIG. 1, the welding bar 2 is first lowered by the two displacing devices 9 configured as mounting 4, 5 until the welding bar 2 touches the two opposite edges of the goods stack 1. Further lowering of the two displacing devices 9 configured as mounting 4, 5 is not possible. At the center of the goods stack 1, however, the welding bar 2 is not yet in contact with the goods stack 1. Then the displacing device 9 arranged between the two mountings 4, 5 and acting in the direction of the film sections to be welded is activated. It pushes the welding bar 2 at the center downwards until the welding bar 2 here too touches the film section. In this position (welding position), the welding bar 2 is curved and follows the concave course of the upper side of the goods stack 1.

In the design of the upper side of the goods stack 1 according to FIG. 2, the welding bar 2 is once again lowered by the two displacing devices 9 configured as mounting 4, 5. During lowering, the welding bar 2 first comes into contact with the goods stack 1 at the center. Since in the region of the two mountings 4, 5 the welding bar 2 is not yet in contact with the upper side of the goods stack 1, the two displacing devices 9 configured as mounting 4, 5 displace the welding bar 2 further in the direction of movement, i.e. orthogonally to the orientation of the side of the goods stack 1 at which the film sections to be welded are situated. The lowering takes place until the welding bar 1 also touches the goods stack 1 in the region of the opposite edges. Through the lowering, the welding bar 1 has become arranged about the convexly configured upper side of the goods stack 1 and in this respect is abutting along its entire length. In this position (welding position), the welding bar 2 is curved and follows the convex course of the upper side of the goods stack 1. In this design of the upper side of the goods stack 1, the use of the displacing device 9 arranged between the two mountings 4, 5 and acting in the direction of the film sections to be welded is not absolutely necessary, if the contact pressure generated by the two displacing devices 9 configured as mounting 4, 5 is sufficiently large. Depending on the length of the welding bar 2, the contact pressure of the welding surface 3 on the film sections to be welded on the segment between two displacing devices 9 configured as mounting 4, 5 can be too low. Then the welding result can be improved if in a supplementary manner at least one displacing device 9 is arranged between two adjacent displacing devices 9 configured as mountings 4, 5 and acting in the direction of the film sections to be welded.

As can be gathered from FIGS. 7 and 8, the displacing device 9 is arranged slidingly at a rail 11. The rail 11 exhibits in the depicted embodiment example at each of its four sides at least one undercut groove 12 extending along the rail 11. In the groove 12 arranged on the right-hand side of the rail 11 there is guided at least one slot nut which is attached to a bracket 22. The displacing device 9 is attached to the bracket 22.

In the depicted design, the displacing device 9 can be slid manually in the rail 11 and thereby along the welding bar 2 in the direction of the longitudinal extension. The position of the displacing device 9 can thereby be adjusted to the contour of the goods stack 1. Since for example in FIG. 1 the deepest place of the hollow is located at the center of the upper side, the displacing device 9 is so oriented that the displacing device 9 is situated above the deepest place.

In the depicted embodiment examples, every displacing device 9 is configured as a cylinder. The cylinder can for example be a pneumatic cylinder or a hydraulic cylinder.

With reference to FIGS. 1 to 4 and 6 and 9 it may be noted that the displacing devices 9 configured as mountings 4, 5 are of course connected with the welding bar 2. Thus the displacing devices 9 exhibit at their free end a screw which is guided in the oblong hole 8 assigned to the welding bar 2. Referring for example to the design according to FIG. 1, the two displacing devices 9 configured as mountings 4, 5 can move the welding bar 2 up and down, whereas the displacing device 9 arranged in the middle can only push the welding bar 2 down.

The basic construction of the welding bar 2 is depicted in FIGS. 8 to 12. The welding bar 2 is configured as a flexible rail, preferably consisting of aluminum, with the welding surface 3 oriented in the direction of the film sections to be welded. Therefore in the present case, the welding bar 2 and thereby also the welding surface 3 is configured as elastically deformable for adjusting the welding surface 3 to a concave course and/or to a convex course of the side of the goods stack 1 between its two ends. The welding surface 3 is configured as a welding wire.

The welding wire is stretched between the two ends of the welding bar 2, where the welding wire is guided along a pressure surface 13 oriented in the direction of the film sections to be welded and insulated through an insulation layer 14 from the pressure surface 13. The pressure surface 13 and the insulation layer 14 can be configured in two parts. It is, however, also certainly possible for the pressure surface 13 itself to form the insulation layer 14. Then the pressure surface 13 can for example be configured as a silicone band. The silicone band serves to insulate the welding surface 3 from the welding bar 2.

In order to prevent the welding wire adhering to the film section to be welded, the welding wire is provided with a sheathing 23 serving as a protective layer. As can be gathered from FIG. 12, the sheathing 23 is configured as a U-shaped rail which after the mounting of the welding wire is fitted onto the welding bar 2. The sheathing can, however, also be configured alternatively as a PTFE adhesive tape. In such a design, the lower region of the welding bar 2 is covered with the PTFE adhesive tape.

As can be gathered in particular from the detail shown in FIG. 10, the rail of the welding bar 2 exhibits a small height such that the rail is easily elastically deformable and in this respect can adjust to the contour of the goods stack 1. The welding bar 2 exhibits the pressure surface 13 oriented in the direction of the film sections to be welded. The welding surface 3 is configured as a welding wire stretched between the two ends of the welding bar 1, which is guided along the pressure surface 13 and is insulated from the pressure surface 13 by the insulation layer 14. The insulation layer 14 is arranged between the welding surface 3 configured as a welding wire and the welding bar 2 and in the depicted embodiment example is configured as a trapezoidal silicone band. The underside of the insulation layer 14 forms at the same time the pressure surface 13.

On the outside there is mounted on each end of rail an end piece 15, which for example consists of a synthetic material. For stretching the welding wire there is provided at each end a tensioning element 16, which is arranged displaceably about a rotational axis 17. The rotational axis 17 is provided in the upper region of the end piece 15. In the lower region of the front face of the end piece 15 there is provided a recess into which a compression spring 18 is inserted. By means of this compression spring 18, the tensioning element 16 is pushed away in the lower region from the welding bar 2. The welding wire is attached to the tensioning element 16 by means of a clamping element 19, which in the depicted case is a small plate secured by two screws. Through the compression spring 18, each tensioning element 16 is pushed away from the welding bar 2 and thereby the welding wire stretched.

In the design for example according to FIG. 3, the free end of the displacing device 9 acting on the welding bar 2 further exhibits a rubber pressure piece 20 which is attached to the displacing device 9 by means of an extension element 21.

The invention claimed is:

1. A device for welding two overlapping film sections situated on a side of a goods stack (1) to form a wrapping, the device comprising:
   a linear welding bar (2) with a welding surface (3) oriented in the direction of the film sections to be welded, the linear welding bar (2) is oriented parallel to the side of the goods stack (1);
   two mountings (4, 5) at least in a region of each of two ends of the welding bar (2), wherein for welding the film sections a spacing between the welding bar (2) and the film sections to be welded is reducible all the way to contact, wherein at least the welding surface (3) of the welding bar (2) is elastically deformable for adjusting the welding surface (3) to a concave course and/or to a convex course of the side of the goods stack (1) between two ends thereof; and
   a first displacing device (9) operably associated with the welding bar (2) between the two mountings (4, 5), the first displacing device (9) configured for adjusting the welding surface (3) to a concave and/or to a convex course of the side of the goods stack (1), wherein in the first displacing device (9) a contact region with which the first displacing device (9) respectively acts on the welding bar (2) is displaceable along the welding bar (2) in a longitudinal extension of the welding bar (2), and wherein the first displacing device (9) comprises a control unit, wherein the first displacing device (9) of the welding bar (2) is individually controllable, such that a curvature of the welding bar (2) for a subsequent welding of the overlapping film sections is adjustable to the contour of the side of the goods stack (1) in a region of the film sections to be welded to one another for the subsequent welding of the overlapping film sections;
   the linear welding bar (2) extending between the two mountings (4, 5),
   the control unit controlling displacement of the first displacing device (9) along the linear welding bar (2).

2. The device according claim 1, wherein the device further exhibits a goods stack displacing device for displacing the goods stack (1) in the direction of the welding bar (2) for welding.

3. The device according to claim 1, wherein at least one of the two mountings (4, 5) is configured as a second displacing device (9) for displacing the welding bar (2) from a rest position, wherein the welding bar (2) is arranged at a distance from the film sections to be welded, in the direction of the side of the goods stack (1) into a welding position, wherein the welding bar (2) is in contact with an upper film section of the two overlapping film sections to be welded with one another, wherein the second displacing device (9) of the welding bar (2) is individually controllable by the control unit, such that the curvature of the welding bar (2) is adjustable to the contour of the side of the goods stack (1) in the region of the film sections to be welded to one another for the subsequent welding of the overlapping film sections.

4. The device according to claim 1, wherein the welding bar (2) is configured as a flexible rail with the welding surface (3) oriented in the direction of the film sections to be welded.

5. The device according to claim 1, wherein the welding surface (3) is configured as a welding wire.

6. The device according to claim 5, wherein the welding wire is stretched between the two ends of the welding bar (2), wherein the welding wire is guided along a pressure surface (13) oriented in the direction of the film sections to be welded.

7. The device according to claim 6, wherein the welding wire is insulated from the pressure surface (13) through an insulation layer (14).

8. The device according claim 1, wherein at least one mounting (4, 5) and/or the first displacing device (9) is arranged slidingly at a rail (11) for displacing a contact region with which the at least one mounting (4, 5) and/or the first displacing device (9) respectively acts on the welding bar (2).

9. The device according to claim 8, wherein the rail (11) exhibits an undercut groove (12) extending along the rail (11) and wherein the at least one mounting (4, 5) and/or the first displacing device (9) each exhibits at least one slot nut interacting with the groove (12) and guided in the groove (12).

10. The device according to claim 1, wherein at least one mounting (4, 5) and/or the first displacing device (9) are manually displaceable.

11. The device according to claim 1, wherein at least one mounting (4, 5) and/or the first displacing device (9) are displaceable in a motorized manner.

12. The device according to claim 1, wherein the first displacing device (9) is configured as a gear rack.

13. The device according to claim 1, wherein the first displacing device (9) is configured as a cylinder.

14. The device according to claim 13, wherein the cylinder is configured as a pneumatic cylinder.

15. The device according to claim 13, wherein the cylinder is configured as a hydraulic cylinder.

16. The device according to claim 2, wherein the welding bar (2) is configured as a flexible rail with the welding surface (3) oriented in the direction of the film sections to be welded.

17. The device according to claim 3, wherein the welding bar (2) is configured as a flexible rail with the welding surface (3) oriented in the direction of the film sections to be welded.

18. The device according to claim 2, wherein the welding surface (3) is configured as a welding wire.

19. The device according to claim 3, wherein the welding surface (3) is configured as a welding wire.

20. The device according to claim 4, wherein the welding surface (3) is configured as a welding wire.

\* \* \* \* \*